(12) United States Patent
Rouse et al.

(10) Patent No.: US 8,171,564 B2
(45) Date of Patent: May 1, 2012

(54) SYSTEMS AND METHODS FOR ONE-TO-MANY SECURE VIDEO ENCRYPTION

(75) Inventors: Alan Rouse, Lawrenceville, GA (US); Paul Christien Bentz, Alpharetta, GA (US)

(73) Assignee: Ericsson Television Inc., Duluth, GA (US)

( * ) Notice: Subject to any disclaimer, the term of this patent is extended or adjusted under 35 U.S.C. 154(b) by 536 days.

(21) Appl. No.: 12/425,944

(22) Filed: Apr. 17, 2009

(65) Prior Publication Data

US 2010/0266127 A1 Oct. 21, 2010

(51) Int. Cl.
*H04N 7/167* (2011.01)
*H04L 9/14* (2006.01)
*H04L 29/06* (2006.01)

(52) U.S. Cl. ............... 726/28; 380/29; 380/45; 380/200; 380/278; 725/30; 725/31

(58) Field of Classification Search ............ 380/29, 380/45, 200, 278; 726/28; 725/30, 31
See application file for complete search history.

(56) References Cited

U.S. PATENT DOCUMENTS

| | | | | |
|---|---|---|---|---|
| 6,173,402 B1 * | 1/2001 | Chapman | | 713/182 |
| 6,327,660 B1 * | 12/2001 | Patel | | 713/193 |
| 6,690,795 B1 * | 2/2004 | Richards | | 380/203 |
| 6,981,145 B1 * | 12/2005 | Calvez et al. | | 713/170 |
| 7,797,342 B2 * | 9/2010 | Banks et al. | | 707/783 |
| 7,818,255 B2 * | 10/2010 | Pandya et al. | | 705/51 |
| 7,836,310 B1 * | 11/2010 | Gutnik | | 713/183 |
| 2002/0007456 A1 * | 1/2002 | Peinado et al. | | 713/164 |
| 2002/0044658 A1 * | 4/2002 | Wasilewski et al. | | 380/239 |
| 2004/0003267 A1 * | 1/2004 | Strom et al. | | 713/193 |
| 2004/0120527 A1 * | 6/2004 | Hawkes et al. | | 380/277 |
| 2005/0223216 A1 * | 10/2005 | Chan et al. | | 713/153 |
| 2006/0059350 A1 * | 3/2006 | Cantwell et al. | | 713/176 |
| 2006/0182277 A1 * | 8/2006 | Sandhu et al. | | 380/44 |
| 2006/0190994 A1 * | 8/2006 | Lee et al. | | 726/5 |
| 2008/0181406 A1 * | 7/2008 | Iyer et al. | | 380/277 |
| 2009/0260077 A1 * | 10/2009 | Zhu et al. | | 726/19 |
| 2010/0138668 A1 * | 6/2010 | Tsuria et al. | | 713/186 |

OTHER PUBLICATIONS

Coppersmith, D. et al. "A proposed mode for triple-DES encryption", Mar. 1996.*
Menezes, Alfred J. et al. Handbook of Applied Cryptography, 1997 CRC Press, LLC, p. 348.*

* cited by examiner

*Primary Examiner* — Michael Simitoski (57) ABSTRACT

A video encryption/decryption scheme is provided allowing an originator of video content to encrypt the video content using a session key, wherein the encrypted content and an encrypted form of the session key are provided to a destination. The session key is encrypted using a long term key value, and the long term key value itself is encrypted using shared secret information that is only stored in the main memory of the originator and destination's systems. The long term key is encrypted, typically by a third party, and provided to the originator and destination systems for encrypting/decrypting the session key. The third party also provides a pass phrase file, which the originator and destination systems can use as input with shared secret information to a certain cryptographic hashing algorithm to encrypt/decrypt the long term key.

5 Claims, 6 Drawing Sheets

SYSTEMS AND METHODS FOR ONE-TO-MANY SECURE VIDEO ENCRYPTION

FIELD OF THE INVENTION

This invention generally pertains to secure video encryption associated with distributing digital video assets, such as encryption involving distributing digital video programs to cable television distribution systems.

BACKGROUND OF THE INVENTION

Most video programs (referred to as an "asset", "video asset", "video content", "digital video asset") such as movies, are distributed in digital form from a source or distributor ("Originator") to a service provider ("Destination") where the service provider makes the program available to its subscribers. In one embodiment, a program producer provides a digital asset to a cable service provider, which in turn, streams the program to viewers on a cable network based on a schedule or as requested. In one embodiment, the program producer (such as HBO®) uploads the digital asset program to a geosynchronous satellite, which relays the signal to various earth stations operated by the cable service provider. Once received by the cable service provider, it may be stored in a memory system (such as disk drives) and further distributed internally to various cable systems. Typically, a number of cable service providers are receiving the satellite signals across the country While the digital asset is usually based on a standard digital video transmission format (typically, but not limited to, one of the MPEG standards), the asset is usually encrypted before transmission. Encryption is necessary because some of the transmission or program distribution mechanisms can be readily accessed or compromised by unauthorized users. Specifically, satellite transmissions can be readily received by anyone in the broadcast 'footprint' of the electromagnetic waves. Other mechanisms, such as cable or optical fiber transmission, can be easily tapped. Further, even if the signals themselves are not monitored during transmission, the information stored in various storage systems can be copied or accessed in various ways.

There is a tremendous value in obtaining an illegal copy of a readily viewable (e.g., non-encrypted), recently released movie. Consequently, there is a financial incentive for encrypting programs. Experience has shown that "pirated videos" (unauthorized copies) can be rapidly distributed and can be great value to those engaged in such illegal activity. Further, the ease in copying and transmitting digital files necessitates an additional level of security to prevent authorized decrypted copies from being made and distributed. The security provided by encrypting the video content must not only to anticipate unauthorized individuals attempting to obtain illegal copies, but must to anticipate also the possibility of employees of the distributors and/or cable service providers attempting to make an illegal copies of the video assets. Specifically, the security mechanism should not allow ready access to the decryption keys which would allow the video programs to be decrypted files.

Encryption of a digital video file requires the recipient to possess the corresponding decryption information, which can be broadly termed as the "decryption key." Because the same key can be used to encrypt as well as decrypt, an "encryption key" is using the key to encrypt information, and a "decryption key" is using the key to decrypt information. Thus, "decryption key" is often used in the context of the Destination system (which decrypts the program) and "encryption key" is used in the context of the Originator. In prior art systems, the program originator would provide the recipient (a cable service provider) with the encrypted video file by one communication channel and the decryption key by a separate communication channel. However, these two pieces of information may be stored on the same computer system at the Originator or Destination systems. In some instances the Destination (or Originator) system would store the encrypted file and the key on two different systems. Thus, even if an unauthorized user were able to obtain a copy of the encrypted video program (only), viewing would not be readily possible without the decryption key. While it may be possible to decrypt the encrypted video program without the decryption key (e.g., using a trial-and-error approach), this requires such significant computer power that such scenarios are not addressed herein.

However, because the decryption key and the encrypted file may be stored in the same file system (or in two systems within the control of the Destination or Originating system), such security schemes are vulnerable to technical personnel (such as a system administrator) having knowledge of where the associated decryption key is stored (e.g., the system administrator). Alternatively, because many of these processing systems are connected to the Internet or other networks, hackers accessing the file store of such systems could find and copy the encrypted video file and the decryption key, and thus readily obtain a decrypted copy of the video program.

There are various prior art encryption methods used that could be adapted, and these may rely on a public-private key combination, require a central key server, or require a central key escrow. These schemes complicate the management of keys when there is a security compromise, or are otherwise vulnerable to Internet viruses, hackers, or other security attacks. Further, when there is the possibility of multiple Destination systems all requiring a decryption key, the logistics of key management can become complicated.

Consequently, systems and methods are needed for an ultra-secure encryption scheme for distributing digital video assets.

SUMMARY OF THE INVENTION

In one embodiment of the present invention, a video asset is encrypted by an Originator using a Session Key. The Session Key is also then encrypted by the Originator, and both the encrypted video asset and encrypted Session Key are transferred to the Destination.

The Originator encrypts the Session Key using a Long Term Key, wherein the Long Term Key is provided in encrypted form to the Originator. The Originator uses a Hash Key generated from a Pass Phrase concatenated with shared secret information ("Shared Secret") to decrypt the Long Term Key in order to produce the decrypted long term key value used to encrypt the Session Key.

In one embodiment, a third party provides the encrypted Long Term Key and the Pass Phrase to both the Originator and Destination. Further, the third part provides software for execution on a processor where the software includes the Shared Secret which is used to decrypt the encrypted Long Term Key. The Destination uses a corresponding decryption process to decrypt the Session Key in order to decrypt the video asset.

BRIEF DESCRIPTION OF THE SEVERAL VIEWS OF THE DRAWING(S)

Reference will now be made to the accompanying drawings, which are not necessarily drawn to scale, and wherein:

FIG. 5 illustrates one embodiment of the decryption process of the video asset; and.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

As should be appreciated, the embodiments may be implemented as methods, apparatus, systems, or computer program products. Accordingly, one embodiment may comprise an entirely hardware embodiment and another embodiment may comprise a computer executing stored program instructions. Furthermore, the various implementations may take the form of a computer program product on a computer-readable storage medium having computer-readable program instructions embodied in the storage medium. Any suitable computer-readable storage medium may be utilized including: hard disks, CD-ROMs, optical storage devices, solid state memory, or magnetic storage devices.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

As used by itself, the word "key" means information that is used to encrypt or decrypt information. Later one, specific types of "keys" will be identified, typically by using an adjective with upper case letter followed by the word "Key" (such as "Long Term" Key). As used herein, a "key" (lower case) can be of various types and is presumed to be in a non-encrypted form and can be of any type. An "encrypted key" is a key which is in encrypted form. A "decrypted key" and "key" are the same in that the key is not encrypted, but because the numerous instances where keys are encrypted, the phrase "decrypted key" may be used to emphasis that the key is not encrypted.

Video Asset Distribution

Figure 1A:
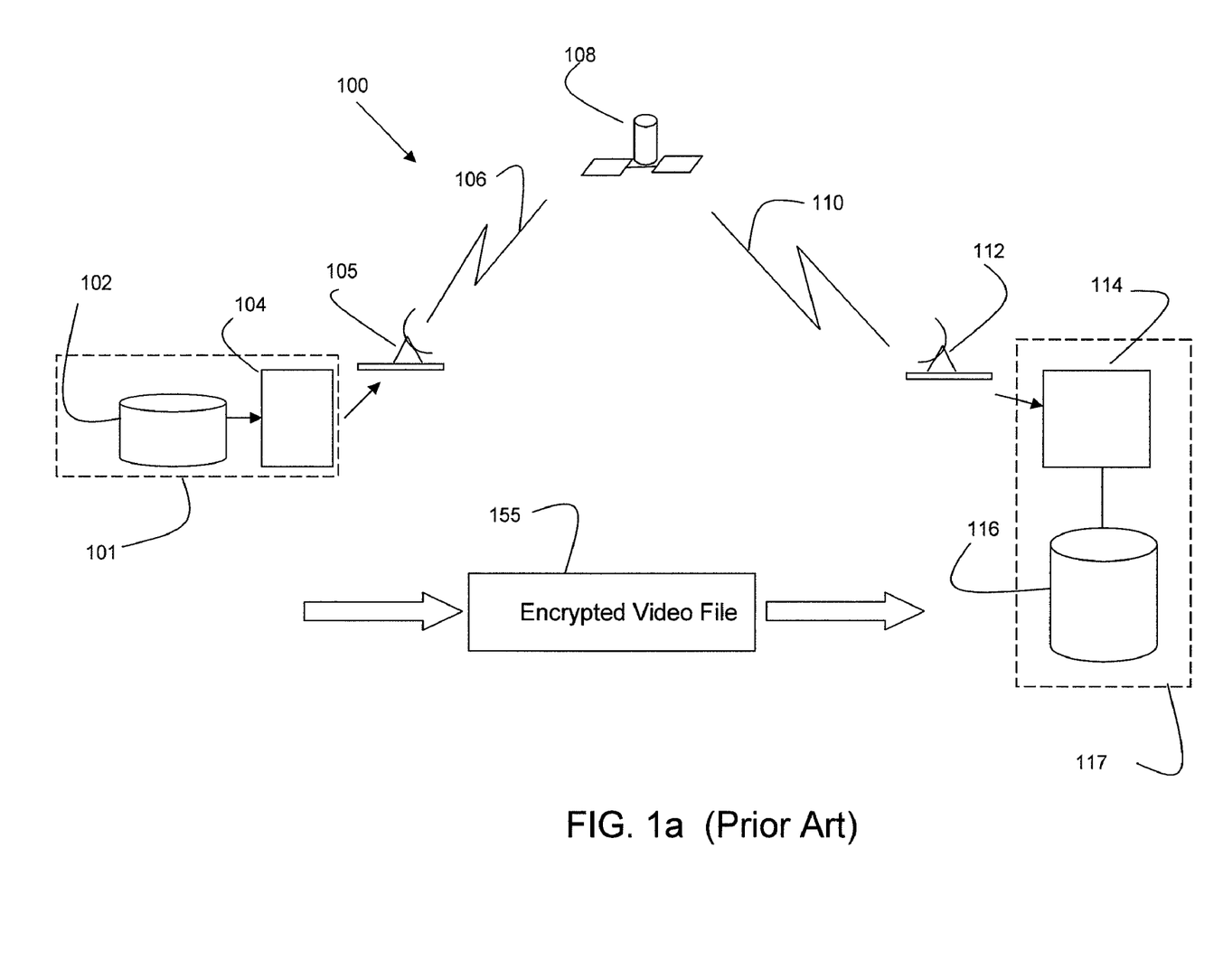
FIGS. 1a-b illustrate an overview of various components involved in a prior art scheme for transferring encrypted video assets.

FIG. 1a illustrates one framework for transmitting video assets in the prior art. The system 100 comprises a program provider 101, which is the source ("Originator") of the video asset in this context that transmits a video asset to a cable service provider 117 or similar entity ("Destination"). In this discussion, it is presumed that the Originator and Destination are cooperating business entities, which typically are not affiliated as related business entities, but could be. Further, it is assumed that the Originator and Destination generally cooperate with each other for purposes of maintaining security of the encrypted video asset.

The program provider 101 may be the producer of the program, a distributor, or some other source providing the video asset. In the context of the present invention, the program provider 101 is the entity desiring to send the video asset to a recipient system 117. The Destination is typically a cable service provider, but could be a service provider using other types of technologies.

Typically, in the prior art, the program provider 101 utilizes a database 102 which stores the video assets and another server system 104 which may embody a processor, encryption equipment, and other equipment as required. The server system 104 retrieves the stored video asset, encrypts the video asset (if it has not already been encrypted) and provides it to a satellite uploading transmitter 105. The transmitter sends the encrypted video asset using radio waves 106 to a satellite 108, which then relays the satellite signal 110 to an earth station 112. There, the signal is provided to the recipient system 117. The recipient system may comprise a processor 114 that receives the streamed digital video from the earth station 112. The processor 114 may store the video asset in a database 116 for playing out at a later time.

In this manner, an encrypted video file 155 is transmitting from the Originator (program provider) to a destination (recipient system). Because the file is encrypted, any entity receiving the broadcast signals 110 is unable to view the video asset unless it posses the appropriate key. Thus, merely obtaining a copy of the encrypted video file by itself without the key allows the video asset to remain secure.

Although this is described in the context of a single Originator and a single Destination, typically the Originator distributes encrypted content to a plurality of Destinations. Often the various Destinations are distinct and unrelated business entities (e.g., separate cable system operators). In other cases, Destinations represent different systems owned or controlled by a common entity (e.g., a multiples system operator having various systems associated with a single corporate cable service provider). Typically, a cable system operator may have multiple systems which receive and store video programs, in part because of the storage volume required or because different geographical serving locations are involved.

However, transmitting the encrypted video asset is only half of the process, so to speak. The encrypted video asset must be decrypted by the Destination for utility to be achieved. Obviously, the process of administering and controlling access to the decryption keys is important to maintaining security. One prior method for managing the encryption/decryption keys is for the Originator to provide the decryption key to the Destination. Some prior art schemes use a common key for both encrypting and decrypting a video asset, or use different keys.

Figure 1B:
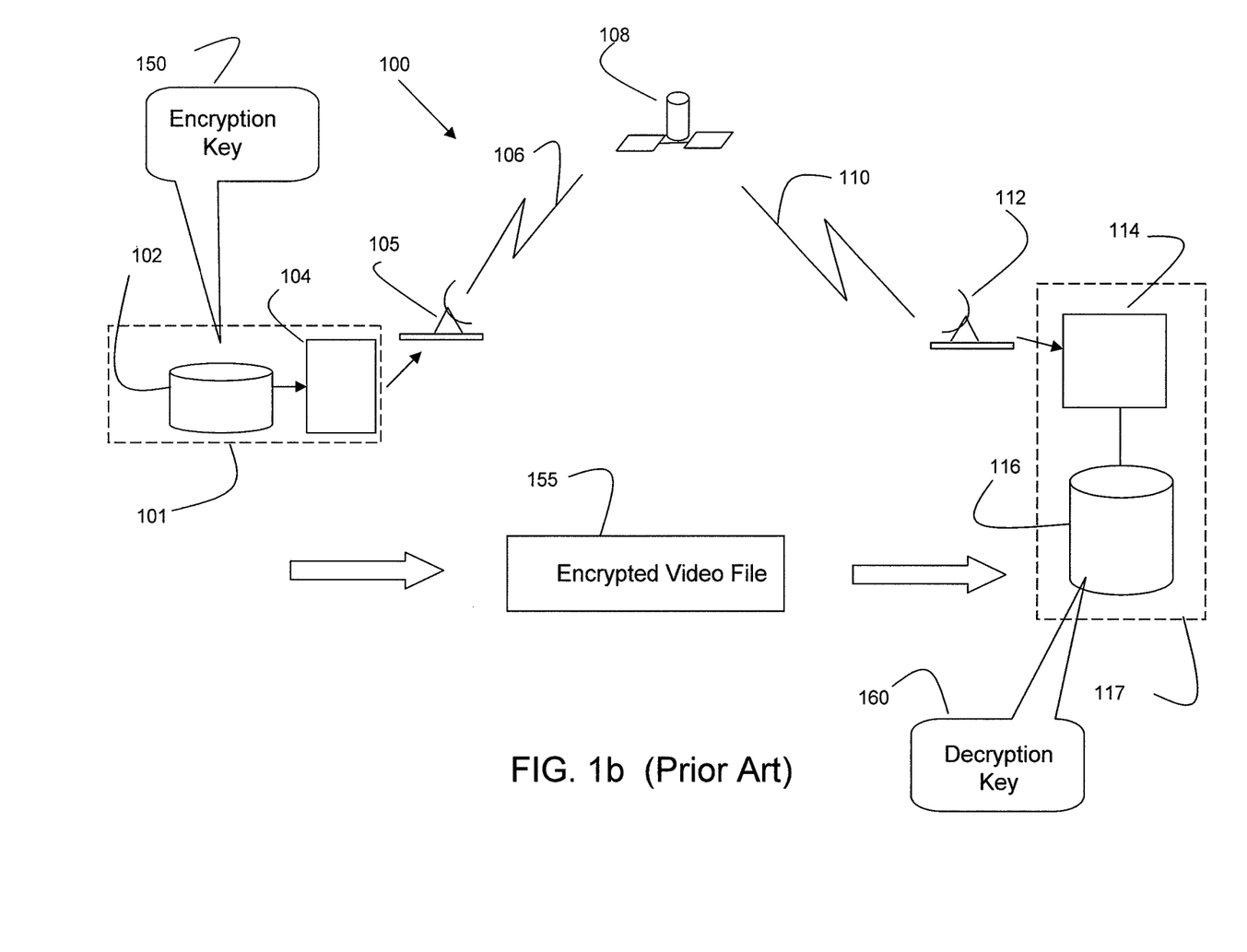

As shown in FIG. 1b, in one prior art scheme, an encryption key 150 is stored in the database 101 and used to encrypt the file when needed, and a decryption key 160 is similarly stored on the database in the destination database 117 and used when needed. The Originator can provide the decryption key to the Destination using a separate communication means. However, this approach is vulnerable in various ways. If the Originator or Destination systems are connected to an open network (e.g., the Internet), then a computer virus may be developed that can read files on the Originator's or Destination's system. Once the key is possessed, the video asset file (if obtained) can be decrypted. It is possible to erase the key after it has been used by the respective Originator or Destination system, but then this presents a separate problem of how to obtain the proper key when it is required. Typically, cable service providers may repeat broadcast a program at different times (such as for a video-on-demand service), and this would require repeating the process of obtaining the appropriate key. The decryption key could be manually loaded on the Destination system when required, but this also has an inherent security issue because a system administrator must be involved to load the value. Thus, the system administrator could copy the key or provide it to a third party.

Although the present invention is described in the context of a single Originator and a single Destination, typically the Originator distributes encrypted content to a plurality of Destinations. This also complicates key management, since if different keys are used, then this requires managing which Destinations receive which keys. Often the various Destinations are distinct and unrelated business entities (e.g., separate cable system operators). In other cases, Destinations represent different systems owned or controlled by a common entity (e.g., various systems that associated with a single corporate cable service provider). Typically, a cable system operator may have multiple video server systems which receive and store movies, in part because of the storage volume required or because different geographical serving locations are involved. In other embodiments, a single Destination may receive encrypted content from various Originators, typically at different times.

Thus, the prior art solutions involving managing the decryption key can be logistically difficult, especially when multiple Destinations are involved, or multiple equipment in a single Destination systems requires copies of the same key.

In one embodiment of the present invention, the key is provided in an encrypted form along with the encrypted asset. These two pieces of information may be in contained in separate files concatenated together, or in a single file comprising two data structures, but sent contiguously in time. For illustration purposes, the encrypted video asset and the encrypted key are presumed to be in two separate but contiguous files transferred together and referred to as a "Package." In other embodiments, the encrypted video can be sent with an intervening time period between it and the key, but the discussion that follows assumes that the two pieces of information are sent together. As will be seen, the present system is designed so that even if an unauthorized entity is able to obtain a copy of the encrypted video file and the encrypted key (the Package), it is still not possible to decrypt the video file knowing only the encrypted key information. Providing the encrypted key with the encrypted video file facilitates key management, because the two are typically provided together. However, as will be seen, additional measures are defined in order to ensure the security of the decryption key.

The key itself for decrypting the video asset is called a "Session Key," and is based on a random number generated from the originating system. Reference to the "Session Key" presumes it is not encrypted, and hence this is the same as the "decrypted Session Key." (In some instances, this may be referenced herein as "(decrypted) Session Key" to provide a reminder as to the encryption status of the Session Key.) Thus, a program provider creates a Session Key and uses it to encrypt the video asset. Various schemes can be used within the scope of the present invention to encrypt the video asset using the Session Key. In one embodiment, a triple DES encryption scheme is used (also known as "3DESE"), which is well known to those skilled in the art, although other types of encryption algorithms can be used, such as the Advanced Encryption Standard (AES). Thus, the Originator determines the actual Session Key value used to encrypt the video content. Typically, the Session Key is based on a random number or value representing an alphanumeric phrase.

As noted, the Session Key is encrypted and conveyed in a Session Key File with the encrypted video asset. An unauthorized user (such as one that receives the satellite downlink broadcast) that obtains the Session Key File with the encrypted asset cannot use the encrypted Session Key by itself to decode the video asset. Additional information is required to decrypt the video asset, beyond merely knowing the encrypted Session Key. This additional is not contained in the encrypted video asset, nor derivable from it. This additional information is a combination of "Shared Information" which is known but not stored in any database of the Originator or Destination, as well as information from files which are typically stored in a database in the Originator's or Destination's systems. Thus, even if an authorized individual is able to obtain a copy of the files on the Originator's or Destination's system, the encrypted Session Key still cannot be decoded, and thus protects the security of the encrypted video asset.

Figure 2:
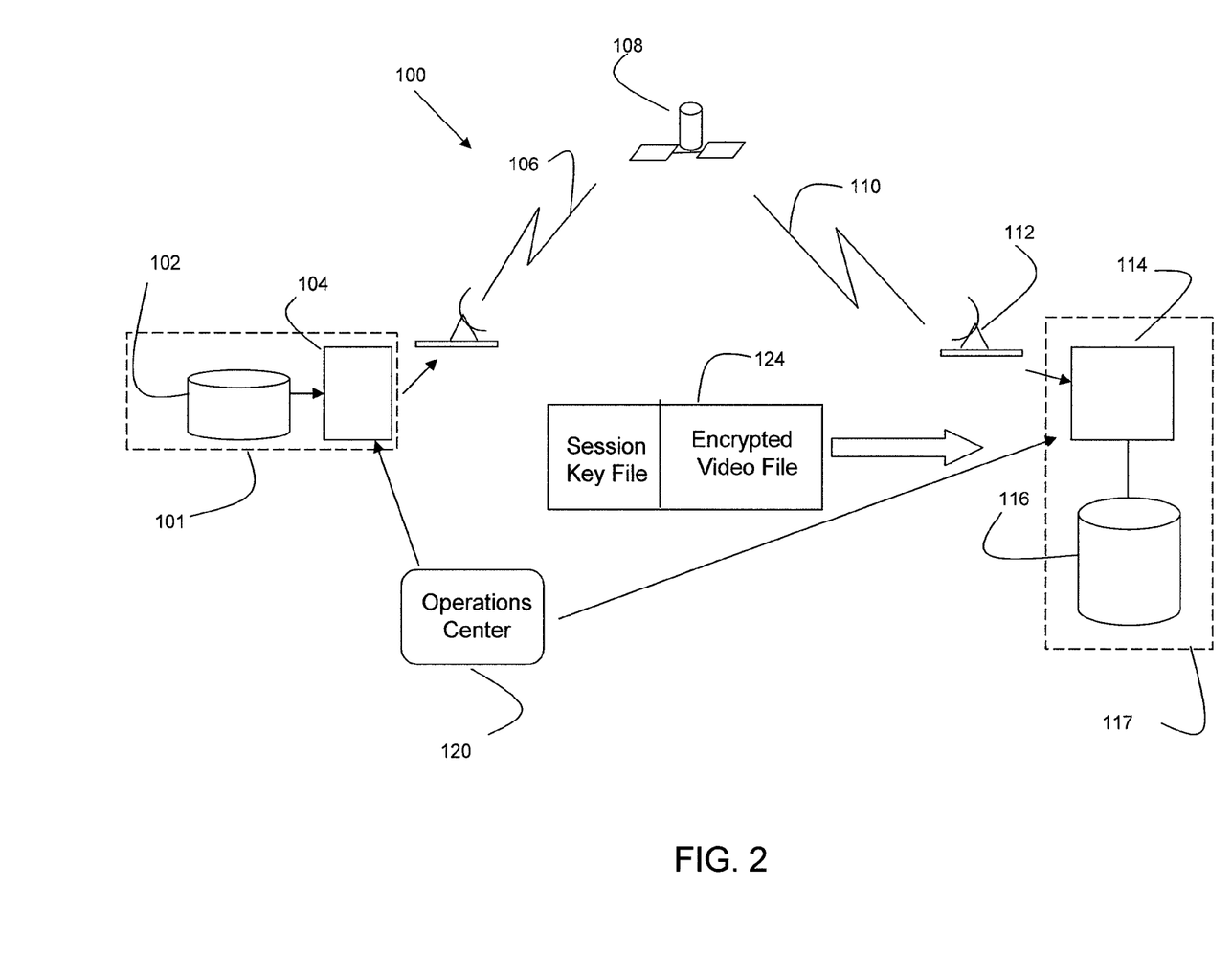
FIG. 2 illustrates one high level aspect of the transferring encrypted video assets according to one embodiment of the present invention.

In FIG. 2, depicting one embodiment of the present invention, the Session Key File and the encrypted video file 124 are illustrated as a two files. No particular file structure or relative positioning of the files is to be inferred, as a variety of file types can be used, and the Session Key may be positioned or formatted in various ways, as can the encrypted video file. The Session Key is generated for the particular video file that is encrypted, and consequently a different video file would have a different Session Key. Further, even if the same encrypted video file were to be transmitted again, a different Session Key may be involved. Typically, if the program were to be resent in a short time period (anywhere from a few days to a few months), the same Session Key would be used. However, if the Package is resent after a longer time period, a different Session Key would be used. It is expected that different Originators may opt for different options. Thus, knowing the Session Key for one video file is of no benefit in decrypting a different video file.

The Session Key is encrypted using a "Long Term Key." The Long Term Key is termed "long term" because typically it is used for a period of time, typically from a few weeks to a few years. However, as it will be seen, the Long Term Key can be replaced when desired or necessary. In some embodiments, the Long Term Key is updated/replaced at periodic intervals, or can be replaced in response at will (e.g., in response to a particular security breach or at the termination of a business relationship between the Originator and Destination). Typically, the Long Term Keys that have been used over time are retained in an encrypted form in the Long Term Key File, often in chronological order. Further, any particular (unencrypted) Long Term Key is generated using a random number generator of the desired length. Obviously, greater the number of digits in the random number, the greater the security that is provided. In one embodiment, the Long Term Keys are generated by a third party. The Long Term Keys (after encrypted) are stored in a Long Term Key File and each is associated with a Long Term Key version number, which indicates which value should be used. Thus, although the Long Term Key File typically contains multiple encrypted Long Term Keys, in other embodiments of the invention, it could contain only one encrypted Long Term Key. The Long Term Key File typically maintains a plurality of encrypted Long Term Keys so as to allow decrypting past encrypted video assets that were encrypted using different Long Term Keys. Recall that encrypted video assets are stored with their associated Session Key, and that knowing the appropriate Long Term Key is required in order to decrypt the Session Key. Maintaining previously used Long Term Keys allows previous encrypted Session Keys to be used, but does not aid in decrypting a newer encrypted Session Key. For example, a Destination may store received Packages received from an Originator over a two year period. The Packages received and stored during the first year require use of a first Long Term Key and the Packages received and stored during the second year require using a second Long Term Key. Thus, the Long Term Key File would comprise both encrypted Long Term Keys and the appropriate value to be used could be identified using the Long Term Key version identifier.

The Originator and Destination cooperate in updating or replacing their respective Long Term Key (and as it will be seen, cooperate in other ways). Further, updating the Long Term Key File itself does not impact the Destination being able to decrypt previous Session Key Files.

As evident, it is necessary to decrypt the encrypted Long Term Key, before the Long Term Key value can be used to encrypt the Session Key. In one embodiment, the Long Term Key is encrypted using a combination of a Pass Phrase and a constant "Shared Secret" that is known to both the Originator and Destination. The Pass Phrase data is not intended to be stored in a file. In this regard, the Originator and Destination are assumed to cooperate in this manner so as to maintain security. In one embodiment, the key for decrypting the Long Term Key is derived by hashing the combination of the Pass Phrase and the constant Shared Secret, using the security algorithm known as SHA-1 (Secure Hash Standard), as found in the Federal Information Processing Standards Publication 180-1, published on Apr. 17, 1995 by the National Institute of Standards and Technology ("NIST"). The result of the hashing algorithm is a "Hash Key."

The Shared Secret information is embedded in an encryption/decryption program in the respective Originating and Destination systems, and is typically stored in the primary memory of the system performing the processing and on a disk. Typically, a third party entity (e.g., the "Operations Center") provides the Shared Secret embedded in a software package that is provided to both the Originator and Destination, and the software includes the algorithms for performing the hashing function.

It would initially appear that access to the Long Term Key file, Shared Secret Information, and the Session Key File would then allow the video asset to be decrypted (and present a security breach if these two files were copied and somehow the Shared Secret Information were known). However, recall that the Long Term Key File comprises encrypted Long Term Keys. Thus, knowing the above information is not sufficient to enable decryption of the video asset. Information must also be known as to how to decrypt the values in the Long Term Key file.

As noted above, in order to decrypt any of the Long Term Keys, a "Pass Phrase File" is required. The Pass Phrase File comprises one or more Pass Phrases and a version number (if more than one Pass Phrase is present). The version of the Long Term Key value matches the version of the Pass Phrase. This is because the "root key" to encrypt a particular version of a Long Term Key is based on using the corresponding version of the Pass Phrase concatenated with the Shared Secret information. The version identifier is typically also indicated in the Package. Thus, the Package comprises the encrypted video content, the encrypted Session Key, and a version identifier.

The Pass Phrase File is typically created by a third party and is communicated to the Originating and Destination systems. Typically, a Pass Phrase File is usually associated with a particular content provider (e.g., Originator). Thus, it is presumed that each different Originator of video assets would likely use a unique Pass Phrase File, but there is no requirement to ensure that different Originators use different Pass Phrases. Thus, it is possible that different Originators could use the same Pass Phrase File Thus, in summary, to produce or obtain the Session Key, the following is required: the Pass Phrase File, the Long Term Key File, an associated version number, and the Shared Secret information used with the appropriate algorithm to produce the Hash Key. While the first two pieces of information may be stored on a disk, the Pass Phrase File is not designed or anticipated to be stored in a file in the Originating or Destination systems, but rather in the primary memory of the processing system. Consequently, copying information on the Originator or Destination's file system is not sufficient to decrypt a video asset.

The Pass Phrase File may be encrypted when stored in the Originator and Destination system and is protected in that neither the Originator nor Destination makes its contents generally available. The Pass Phrase file, as will be seen, is usually only stored in volatile memory of the system, and not in the file store. Further, it is usually transmitted to using a secure communications link to the Originator and/or Destination. Once it is received over the secure communications link, the aforementioned software program has the Pass Phrase File in the "clear", but then typically encrypts it using any of the readily available encryption algorithms so that when the Pass Phrase File is stored in main memory, it is stored in an encrypted form. In some embodiments, the same Shared Secret information can be used as the basis for encrypting the Pass Phrase File. Recall that knowledge of the Pass Phrase File by itself, does not allow decryption of the Session Key File, in order to obtain a Session Key.

Both the Originating and Destination system must have common versions of the Pass Phrase File and the Long Term Key Files. Typically, they also have coordinated software modules provided to them by a third party to process the various data identified above, and which also maintains the Shared Secret information. To facilitate the establishment of this, an Operations Center facilitates creating and transferring this information and provides the software modules. The Operations Center is usually a neutral third party that is not affiliated with either the Originator or Destination. Thus, because the Originator and Destination are assumed to cooperation in maintaining security of the video asset, they are assumed to cooperate with the Operations Center with respect to reviewing the Pass Phrase File and Long Term Key Files.

As shown in FIG. 2, the Operation Center 120 has communication links (or uses a secure third party network for establishing communication links) with the Originator and destination systems. The transfer of information over these links are typically secure, and may use commonly available security mechanisms, such as HTTPS, SSH, SSL, quantum key exchange, or other proprietary security protocols to transfer the information in a secure manner. Typically, an application program executing in the Operations Center ("Tool") is used to create, edit, and transfer the Pass Phrase File and the Long Term key Files and their contents. For added security, the transfer of these files is usually done as separate transfers in a non-contiguous manner. Further, the communication links used by the operations center to transfer these files are typically a different communication link from the transfer of the video asset itself along with the Session Key. In some embodiments, the communication link for transferring the Long Term Key is a different communication link from transferring the Pass Phrase File. Thus, if an unauthorized user is able to monitor traffic from an Originator or to a Destination, monitoring one communication link would not allow decryption of the video asset.

Figure 3:
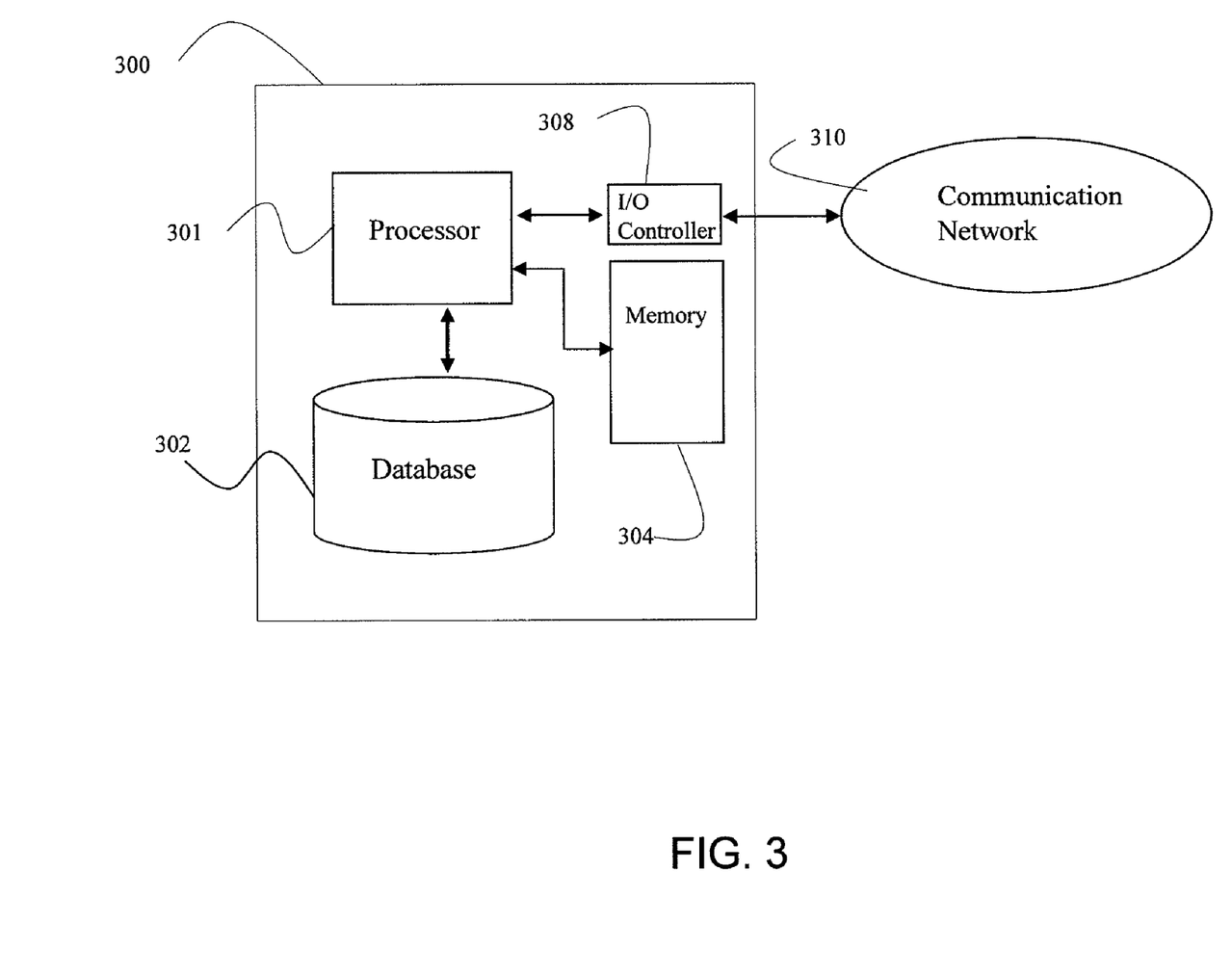
FIG. 3 illustrates one embodiment of the present invention of a system architecture for encrypting or decrypting the video asset.

The Originating or Destination system that performs the encryption/decryption is a computing system comprising a processor and primary and secondary storage, executing the appropriate computer instructions to perform the required function. Typically, the Operations Center provides a software module to the Originating and Destination system that processes the information and contains the Shared Secret information. One embodiment of the computing system is shown in FIG. 3. In FIG. 3, one embodiment of the system 300 comprises a processor 301, which may be a single processor, or distributed processors functionally acting as a single logical resource. This includes various network configurations of processors, such as parallel processors, so called "blade" processors, or other configurations known to those skilled in the art. The processor is executing various instructions (in one or more computer programs) which accomplish the desired functions. The processor 301 interacts with two main forms of data storage, a database or disk storage system 302 (which is a referred to as secondary memory) and main memory 304, which is typically solid state memory (and which is referred to as primary memory). Various hardware or devices can be used to provide the primary and secondary memory as known to those skilled in the art. The processor is typically able to communicate via an input/output controller 308, in order to send/receive information over a communication network 310. The communication network may be a private or public network, and in one embodiment, may comprise the Internet. The communication network is typically used to convey the Long Term Key File and the Pass Phrase File to the respective Originating and Destination system, although other mechanisms can be used to transfer this information, such as delivery of CD disks comprising the appropriate data. If the communication network is used, typically secure communication protocols are used, such as HTTPS. A similar architecture can be used for the Operation Center. Other variations on the architecture will be apparent to those skilled in the art.

Originating System Process

Figure 4:
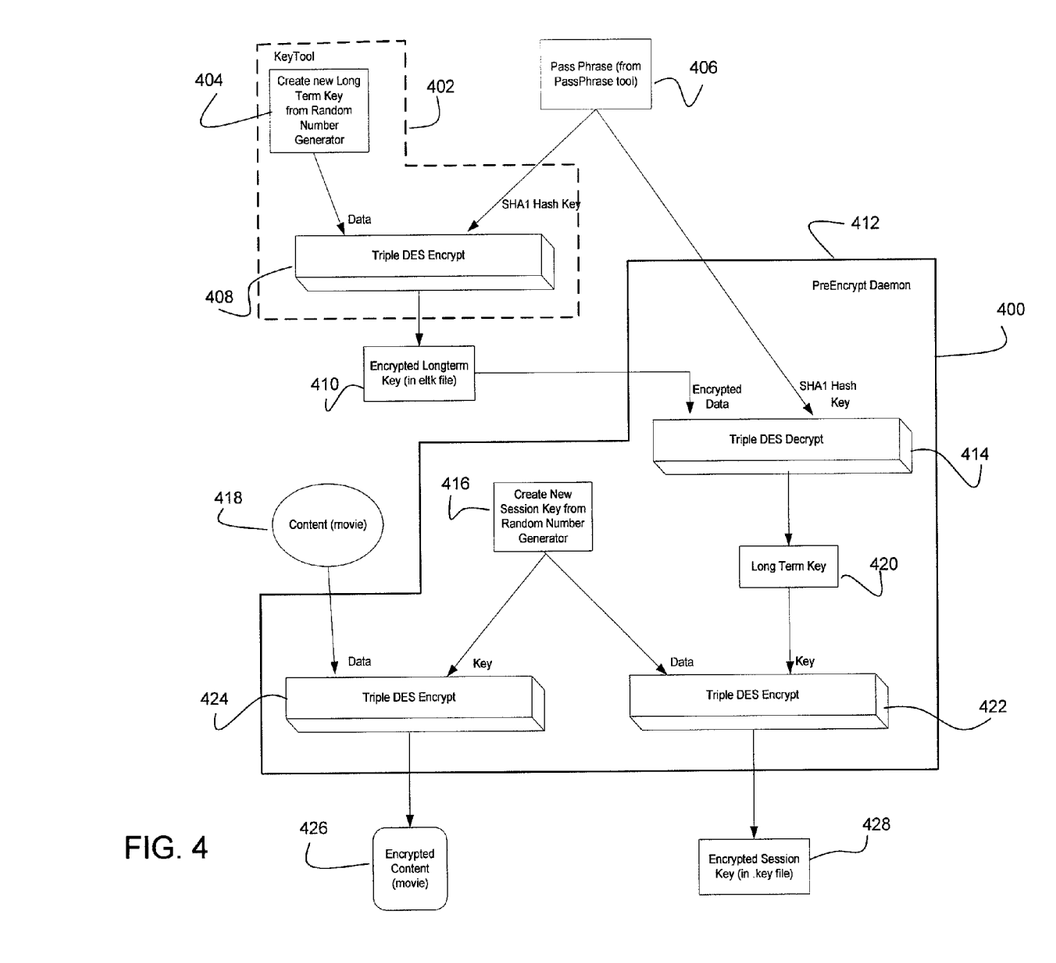
FIG. 4 illustrates one embodiment of the encryption process of the video asset.

One embodiment of the process for encrypting a video asset is illustrated in FIG. 4. In FIG. 4, the overall process can be described as the Originating system 400 encrypting a movie 418 using a Session Key 416 to produce an encrypted video asset 426. The encrypted content and the encrypted Session Key are provided to the Destination. Recall that the encrypted Session Key is in the Session Key File 428. The encrypted video content, the encrypted Session Key, and version identifier is transmitted in a Package from the Originator to the Destination.

While the Originating system can select its own Session Key, the Session Key is encrypted using a Long Term Key 420, which is obtained by decrypting a Long Term Key File 410 provided to the Originating system, typically by the Operations Center. Thus, the Originating system typically does not create its own Long Term Key values, but is provided the value (in encrypted form) by the third party.

The process for obtaining the Long Term Key value requires identifying the appropriate encrypted Long Term Key in the file (using the version number) and then decrypting it to produce the Long Term Key value. The Long Term Key is generated using a random number generator at step 404. The Long Term Key is encrypted using a Hash Key that is generated by concatenating the Shared Secret with the Pass Phrase using the SHA-1 algorithm. The Hash Key used to encrypt the Long Term Key typically uses a triple DES encryption process at step 408 although other encryption processes, such as AES, can be used. The Pass Phrase File is typically created by the Operations Center using a Tool, and the Pass Phrase itself can be a series of words or letters. Its original value can be text representing a phrase, or it can be alphanumeric or other numerical sequence.

The Pass Phrase File 406 is provided to both the Originator and Destination systems by the Operations Center using a secure and separate encrypted transmission path. When the transmission layer provides the Pass Phrase File to the aforementioned software module, the module encrypts it prior to storing the Pass Phrase File in memory. The Pass Phrase File is preferably only stored in main memory of the respective Originating and Destination computing systems, and is not stored as a file in the disk storage system. Thus, access to the files on the Originating or Destination disk storage systems would not provide access to the Pass Phrase File. This means that anytime the Originating or Destination system is rebooted (or main memory is otherwise cleared) a replacement Pass Phrase File is obtained from the Operations Center. However, as discussed, knowledge of the Pass Phrase File itself is insufficient to decode a Session Key File.

In summary, the Pass Phrase File is concatenated with the Shared Secret information and hashed to produce a Hash Key that is used by the Originator, Destination, and Operations Center. Typically, the Operations Center uses the Hash Key to encrypt the Long Term Key, and the Originator and Destination systems use the Hash Key in decrypting the Long Term Key File. The hash function is based on an algorithm in a software module executing in the Originating System to decrypt the Long Term Key File and is the same algorithm used by the Operations Center to create the Long Term Key File. As long as the same algorithm is used, it can be of different forms.

The (encrypted) Long Term Key File is then decrypted at step 414 by the Originator using the same Hash Key previously identified to produce the Long Term Key 420 that encrypts the Session Key at step 422. To recap, the (unencrypted) Session Key 416 is generated using a random number generator, and is the value that is used in step 424 to encrypt the video asset 418 to produce the encrypted video asset (movie) 426. The same Session Key 416 used to encrypt the movie is then encrypted itself at step 422 using the Long Term Key 420. This produces the (encrypted) Session Key 428.

Although a SHA-1 and the triple DES encryption scheme are illustrated as encrypting/decrypting information, the present invention encompasses use of other encryption/decryption schemes and algorithms that are well known in the art.

Destination System Process

Figure 5:
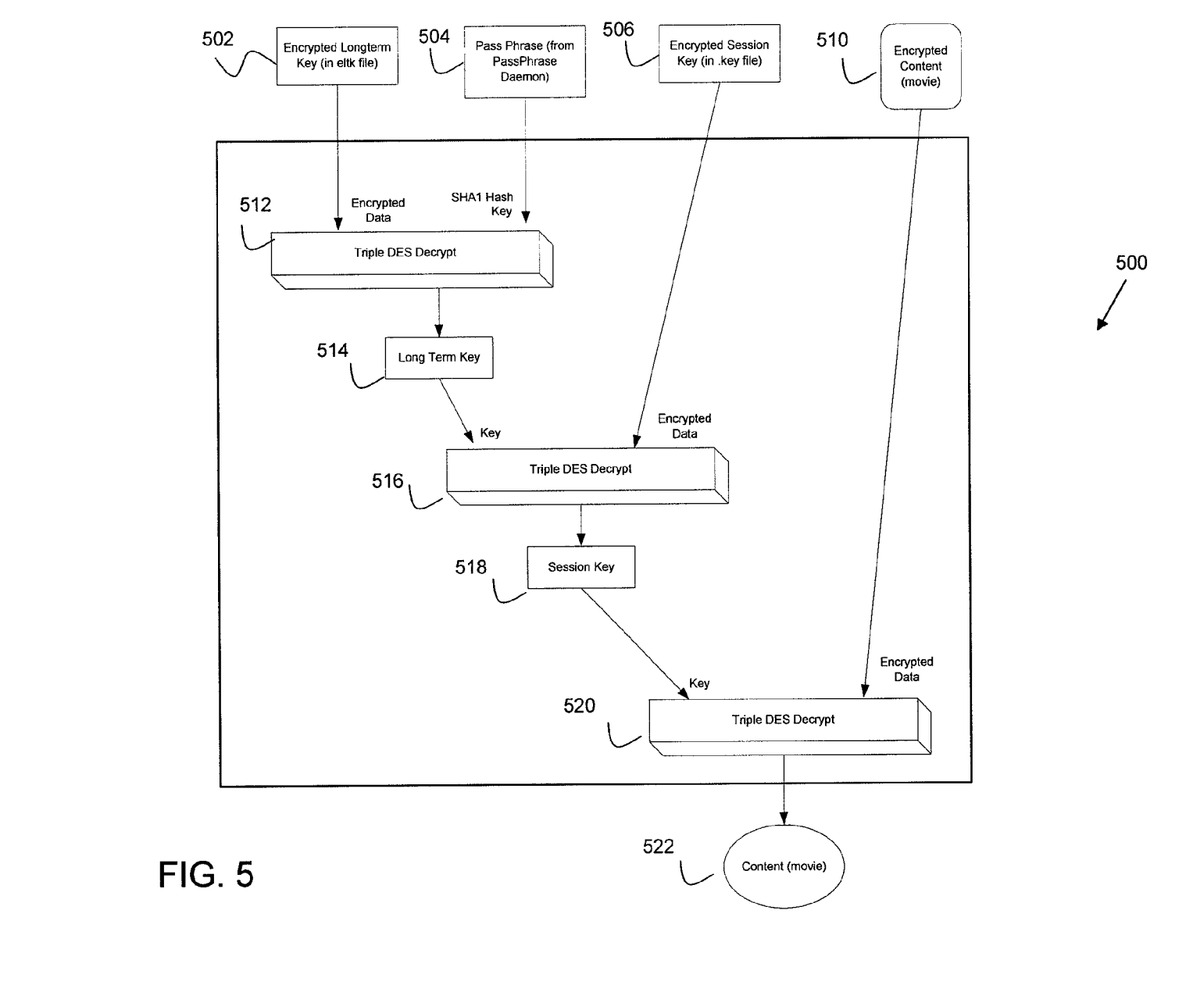

One embodiment of the decryption process performed at the Destination system is shown in FIG. 5. In FIG. 5, the Destination processing 500 is shown as using various input information. At a high level, the function of the process is to decrypt an encrypted video asset (e.g., movie) 510 using the accompanying encrypted Session Key 506. Recall that encrypted content and the encrypted Session Key are transmitted together along with a version number of the corresponding Pass Phrase and Long Term Key. The encrypted Session Key can only be used for decrypting that particular video content, and the encrypted Session Key must be first decrypted.

Thus, the processing at the Destination system 500 focuses on decrypting the received (encrypted) Session Key 506 so that it can be used to decrypt the encrypted video asset. The Destination system is presumed to readily have other information in the form of the Long Term Key File 502 (comprising different encrypted Long Term Keys), the appropriate Pass Phrase 504 (contained in a Pass Phrase File comprising different Pass Phrases maintained in primary memory and typically not stored in persistent storage (such as disk storage)) and the Shared Secret information embedded in the program used in the Originator and Destination systems.

The information in the Long Term Key File is encrypted, so it must be first decrypted. This is accomplished by deriving the same Hash Key using the Pass Phrase and the Shared Secret information using the same SHA-1 hashing algorithm in step 512. Once the Hash Key is derived, the Hash Key is used to decrypt the appropriate encrypted Long Term Key value in the Long Term Key File to produce the (decrypted) Long Term Key value 514.

Once the Long Term Key value 514 is known, it is then used to decrypt the encrypted Session Key using the triple DES algorithm at step 516 to produce the (decrypted) Session Key 518. With the Session Key decrypted, it can then be used in step 520 to decrypt video content to produce the (decrypted) video content 522.

It is evident that this scheme provides security in various ways. First, if the files on the Originating or Destination system are compromised (e.g., the drive itself is stolen or a computer virus reads the files, or the files are otherwise transferred to an unauthorized recipient), the Long Term Key File comprising encrypted Long Term Keys and the (encrypted) Session Key cannot be used by themselves to decrypt the video content. In order to decrypt the Long Term Key File, the Pass Phrase (stored in memory), version number, and the appropriate Shared Secret Information must be also known. Second, an unauthorized user "listening" to the Package transferred between the Originator and Destination does not possess sufficient information to decrypt the video asset. Further, an unauthorized user "listening" to the Operations Center transferring a Pass Phrase or Long Term Key File does not provide by itself sufficient information to decrypt the video asset.

Further, if a security compromise is detected, the Operations Center can be notified and generates a new Long Term Key that it transmits as an updated file to the Originator and Destination. A corresponding updated version number is also indicated as appropriate. Recall that the version number indicates which Long Term Key in the Long Term Key File to be used, and is included in the Package when transmitted. The Long Term Key typically is periodically changed every month or year for preventative security reasons, so this provides a mechanism for updating the Long Term Key (and Pass Phrase, if required) if conditions dictate doing so. The Long Term Key File may contain a number of values in it. This allows decrypting of a previously received and stored encrypted video assets and associated encrypted Session Key. The Long Term Key File is typically stored in a file store or database system at the Originator or Destination System. Further, the Operations Center may retain a copy. Similarly, it is possible to update the Shared Secret information by providing a new software module to the Originator and Destination systems.

If for some reason the Long Term Key File in the data store on one processing system is corrupted, then other authorized equipment at the Destination can be used to decrypt the program, or can provide a restoral copy of the Long Term Key File.

In addition, the Pass Phrase can be similarly updated if needed. The Pass Phrase is stored in primary memory (as opposed to disk storage). Thus, if the contents of memory in the Origination or Destination systems are corrupted (or power is lost), that system will have to obtain a replacement Pass Phrase (typically from the Operations Center).

The Operations Center is typically operated by a separate entity relative to the Originator and Destination entities. Typically, there is a degree of "trust" in that the Originator and Destination entities are willing to accept updated Long Term Key Files or Pass Phrase Files from the Operation Center. Thus, if the Originator or Destination detects and reports a security compromise and reports this to the Operations Center, the Operation Center can quickly transmit updated Long Term Key Files and Pass Phrase Files as appropriate. Typically, these files are transmitted at different time and/or on different facilities, in a secure manner using readily available encryption, such as SSL, SSH, etc.

In an alternative embodiment, the Originator and Destination systems may comprise multiple computing systems. For example, a system (either Originator or Destination) may have a first computing system that processes the various encryption related data in order to produce the Session Key, and a separate computing system that then uses the Session Key to decrypt the encrypted video asset. Still further, a separate data processing system or headend system may receive the decrypted video asset for broadcasting. In other embodiments, a VOD system or other storage system may be involved providing a local store for the Packages.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

That which is claimed:

1. A computer system for decrypting an encrypted video content, comprising:
   an interface to a communications network configured to receive the encrypted video content and an encrypted session key wherein the encrypted session key is used to decrypt the encrypted video content;
   a primary memory of the computer system, said primary memory storing a pass phrase file comprising a pass phrase, said primary memory further storing a software module comprising shared secret information wherein the shared secret information and the pass phrase are used by a cryptographic hashing algorithm to produce a hash key;
   a disk storage subsystem of the computer system, said disk storage subsystem storing an encrypted long term key in a long term key file wherein said disk storage subsystem does not store said pass phrase, wherein
      the encrypted long term key is received using a second interface to a second communications network receiving said encrypted long term key and stored by said processor in said disk storage system; and
   a processor of the computer system configured to perform the steps of:
      retrieve the encrypted long term key from said disk storage subsystem,
      access the pass phrase in said primary memory, use said pass phrase and a shared secret data as data input when executing said software module comprising a cryptographic hashing algorithm and executing the cryptographic hashing algorithm thereby providing said hash key, use said hash key and encrypted long term key as input to a first decryption algorithm to produce a decrypted long term key, use the decrypted long term key and encrypted session key as input to a second decryption algorithm to decrypt the encrypted session key thereby producing a decrypted session key, wherein the decrypted session key is used to decrypt the encrypted video content and wherein the processor receives the encrypted video content and an encrypted session key from a first data processing system in a single file and receives both the encrypted long term key and the pass phrase from a second data processing system.

2. The system of claim 1 wherein the cryptographic hashing algorithm is a SHA-1 cryptographic hashing function and said pass phrase is concatenated with the shared secret data prior to processing by said hashing function.

3. The system of claim 1 wherein the first decryption algorithm and the second decryption algorithm are triple data encryption standard algorithm.

4. The system of claim 1 wherein the processor is configured to provide the decrypted session key to a second processor, wherein said second processor is configured to decrypt the encrypted video content.

5. The system of claim 1 wherein the disk storage subsystem storing an encrypted long term key comprises storing a plurality of encrypted long term key values in said long term key file.

* * * * *

UNITED STATES PATENT AND TRADEMARK OFFICE
CERTIFICATE OF CORRECTION

PATENT NO. : 8,171,564 B2  
APPLICATION NO. : 12/425944  
DATED : May 1, 2012  
INVENTOR(S) : Rouse et al.

Page 1 of 1

It is certified that error appears in the above-identified patent and that said Letters Patent is hereby corrected as shown below:

On the title page, item "57", under "ABSTRACT", in Column 2, Line 8, delete "originator" and insert -- originator's --, therefor.

In Column 1, Line 30, delete "country" and insert -- country. --, therefor.

In Column 3, Line 11, delete "asset;" and insert -- asset; and --, therefor.

In Column 3, Line 13, delete "asset; and." and insert -- asset. --, therefor.

Signed and Sealed this  
Twenty-second Day of January, 2013

David J. Kappos  
*Director of the United States Patent and Trademark Office*